US009523975B2

(12) United States Patent
Sonoda

(10) Patent No.: US 9,523,975 B2
(45) Date of Patent: Dec. 20, 2016

(54) SERVO CONTROLLER FOR REDUCING SYNCHRONOUS ERROR IN SYNCHRONOUS MACHINING

(71) Applicant: FANUC Corporation, Yamanashi (JP)

(72) Inventor: Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/680,658

(22) Filed: Apr. 7, 2015

(65) Prior Publication Data

US 2015/0286197 A1 Oct. 8, 2015

(30) Foreign Application Priority Data

Apr. 8, 2014 (JP) ................................ 2014-079565

(51) Int. Cl.
$G05B\ 15/02$ (2006.01)
$G05B\ 1/01$ (2006.01)
$G05B\ 11/01$ (2006.01)

(52) U.S. Cl.
CPC ................. G05B 15/02 (2013.01); G05B 1/01 (2013.01); G05B 11/011 (2013.01)

(58) Field of Classification Search
CPC .......... G05B 15/02; G05B 11/011; G05B 1/01
See application file for complete search history.

(56) References Cited

U.S. PATENT DOCUMENTS

| 5,434,486 | A | * | 7/1995 | Tanaka | H02P 5/526 318/69 |
| 6,534,944 | B2 | * | 3/2003 | Toyozawa | G05B 19/19 318/611 |
| 2003/0125831 | A1 | * | 7/2003 | Toyozawa | G05B 19/186 700/193 |
| 2004/0180606 | A1 | * | 9/2004 | Iwashita | H02P 5/52 451/5 |

(Continued)

FOREIGN PATENT DOCUMENTS

| CN | 1527170 A | 9/2004 |
| CN | 1892523 A | 1/2007 |

(Continued)

*Primary Examiner* — Shawki S Ismail
*Assistant Examiner* — Muhammad S Islam
(74) *Attorney, Agent, or Firm* — Hauptman Ham, LLP

(57) ABSTRACT

A servo controller includes: a first position feedback acquisition unit; a second position feedback acquisition unit; a converter converting the acquired position feedback of the first shaft to a value corresponding to the position feedback of the second shaft based on a synchronous ratio; a synchronous error calculator calculating synchronous error which is difference between the converted position feedback of the first shaft and the position feedback of the second shaft; a positional deviation calculator calculating a positional deviation of the second shaft which is difference between the position command for the second shaft and the position feedback of the second shaft; a filtering processor extracting components in a predetermined frequency range from the difference between the synchronous error and the positional deviation of the second shaft; and, a positional (Continued)

deviation corrector correcting the positional deviation of the second shaft by use of the output from the filtering processor.

6 Claims, 9 Drawing Sheets

(56) References Cited

U.S. PATENT DOCUMENTS

| | | | |
|---|---|---|---|
| 2006/0125438 A1* | 6/2006 | Fujibayashi | G05B 19/4142 318/575 |
| 2007/0007926 A1 | 1/2007 | Iwashita et al. | |
| 2008/0218116 A1* | 9/2008 | Maeda | G05B 19/19 318/571 |

FOREIGN PATENT DOCUMENTS

| | | |
|---|---|---|
| CN | 101261509 A | 9/2008 |
| JP | 59-35729 B2 | 8/1984 |
| JP | 2003-200332 A | 7/2003 |
| JP | 2006-190074 A | 7/2006 |
| JP | 2007-42068 A | 2/2007 |
| JP | 2008-225533 A | 9/2008 |
| JP | 4361071 B2 | 11/2009 |
| JP | 2012-175875 A | 9/2012 |

\* cited by examiner

SERVO CONTROLLER FOR REDUCING SYNCHRONOUS ERROR IN SYNCHRONOUS MACHINING

CROSS-REFERENCE TO RELATED APPLICATIONS

This application is a new U.S. patent application that claims benefit of JP 2014-079565, filed on Apr. 8, 2014, the entire content of JP 2014-079565 is hereby incorporated by reference.

FIELD OF THE INVENTION

The present invention relates to a servo controller for controlling a machine such as a machine tool using electric motors, in particular relating to a servo controller that reduces synchronous error (sync error) in performing machining while synchronizing two shafts driven by electric motors.

BACKGROUND OF THE INVENTION

In machine tools, there are cases in which a workpiece is processed using multiple shafts in synchronism. As for such cases, as a machining process by synchronizing two shafts, namely, the first and second shafts, with a fixed synchronous ratio (sync ratio), examples of which are as follows.

As a first example, a thread cutting process is known. FIG. 1 is a schematic diagram of a machining system for performing a thread cutting process. A thread cutting system 1000 performs a machining process by synchronizing a master motor 1002 for turning a rod-shaped workpiece 1001 to be processed with a slave motor 1004 for moving a cutter 1003 as a tool. By moving the cutter 1003 in synchronization with the revolution of the rod-shaped workpiece 1001 at a predetermined ratio, a male thread is formed on the rod-shaped workpiece 1001. Alternatively, the rod-shaped workpiece 1001 may be moved while the cutter 1003 is fixed.

As a second example, a tapping (rigid tap) process is known. FIG. 2 is a schematic diagram of a tapping system. A tapping system 1010 machines a workpiece 1011 for processing by synchronizing a slave motor 1014 for turning a tapper 1013 as a tool with a master motor 1012 for moving the tapper 1013 as a tool. By moving the tapper 1013 in synchronization with the revolution of the tapper 1013 at a predetermined ratio, a female thread is formed inside a bore of the workpiece 1011. Alternatively, the workpiece 1011 may be moved while the tapper 1013 is fixed.

As a third example, a gear generating process is known. FIG. 3 is a schematic diagram of a gear generating system. In a gear generating system 1020, a workpiece gear 1021 for processing is fixed to the workpiece shaft, namely C-shaft, which is turned by a slave motor 1024. On the other hand, a grinder 1023 as a tool is fixed to the tool shaft, namely B-shaft, which is turned by a master motor 1022. Machining is performed by synchronizing the revolution of the tool shaft (master) with that of the workpiece shaft (slave) at a predetermined ratio (=number of teeth of the cutter/number of teeth of the gear, which will be referred to herein below referred to as "sync ratio").

Generally, in the machine control as above, the following two methods are used.

1) Feedback Tracking Method

Feedback tracking method is a method whereby the feedback of the master shaft is multiplied by the synchronous ratio so as to be used as a command to the slave shaft (for example, Publication of Japanese Examined Patent Application (Kokoku) No. 59-35729).

FIG. 4 is a schematic diagram of a machining system using a feedback tracking method. A servo controller 1040 using a feedback tracking method includes a first servo control unit 1043 for controlling a master motor 1033 that turns a tool 1031 about a master shaft and a second servo control unit 1041 for controlling a slave motor 1034 that turns a workpiece 1032, and multiplies the feedback of the master shaft by a synchronous ratio (gear ratio) at a multiplier 1042 so as to produce a command to the slave shaft.

2) Command Distribution Method

Command distribution method is a method whereby a command to the master shaft is multiplied by a synchronous ratio to produce a command to the slave shaft (e.g., Japanese Patent Application Laid-open No. 2003-200332 (JP2003-200332A)).

FIG. 5 is a schematic diagram showing a machining system using a command distribution method. A servo controller 1050 using a command distribution method includes a first servo control unit 1053 for controlling a master motor 1033 that turns a tool 1031 about a master shaft and a second servo control unit 1051 for controlling a slave motor 1034 that turns a workpiece 1032, and multiplies the command to the master shaft by a synchronous ratio (gear ratio) at a multiplier 1052 so as to produce a command to the slave shaft.

The above 1) has the advantage that use of the feedback of the master shaft as a command to the slave shaft makes it possible to suppress synchronous error even when the speed of the master shaft is changed. However, if there is a vibration depending on the rigidity of the tool, workpiece and/or the mechanical part for driving these, the vibration may be amplified by the loop as follows to make the system unstable, and therefore this method has the following disadvantage:— vibration→master (tool)→master shaft feedback→slave shaft command→slave shaft control→slave (workpiece)→master (tool).

On the other hand, since in the above 2) the command to the master shaft is used to command the slave shaft, the aforementioned loop is not formed, and therefore the above 2) has the advantage that no vibration amplification will occur and is excellent in stability. However, this method has the disadvantage that synchronous error occurs with respect to the speed change of the master shaft.

Conventionally, the above two methods have been used selectively depending on the machining condition and mechanical condition. For example, in a machine that uses a speed reducer for the master shaft, the servo stiffness of the master shaft cannot be made high. Accordingly, if a strong machining disturbance acts, speed variation of the master shaft arises. In such a case, the above control method 1) is used.

On the other hand, when vibrations occur depending on a load applied during machining, the rigidities of the tool, workpiece and the mechanical part for driving these, the above control method 2) is adopted in order to avoid amplification of vibrations resulting from the aforementioned loop.

In this way, in the prior art, there has been the problem that synchronous error cannot be sufficiently lowered in a machine in which the master shaft is low in servo stiffness, hence speed change may occur due to machining disturbance, and therefore vibrations depending on the mechanical rigidity occur.

In this case, in the conventional method, on the basis of the above control method 2) the synchronous error between the master and slave shafts is used to correct one of the shafts.

For example, there has been a known method to correct the positional deviation of the slave shaft based on the synchronous error between the master shaft and the slave shaft to be synchronized with the master shaft and learning control (e.g., Japanese Patent No. 4361071 (JP4361071B)). According to this conventional technology, the positional deviation of the slave shaft is corrected using synchronous error and learning control so as to reduce periodical synchronous error, on the basis of the above control method 2). This method can reduce synchronous error deriving from periodical deviation by learning control, but has the problem that aperiodic synchronous error cannot be suppressed. This method discloses a filtering means for band limitation. This is valid for positional correction against periodic synchronous error below the predetermined band, but cannot make any positional correction for aperiodic synchronous error even if the error is below the predetermined band, and worse still, may amplify the error.

In general, vibrations that occur are based on the rigidities of the tool, and therefore the workpiece and the mechanical part for driving these are of high frequencies. For example, the high frequency herein is equal to or higher than 100 Hz, which is in the range difficult to handle by servo control. On the other hand, the vibrations due to load disturbance during machining and the frequency components synchronized with revolutions of the tool and the workpiece are of low frequencies. This low frequency is less than, for example 30 Hz, which is in the servo controllable range.

The object of the present invention is to provide a servo controller for performing control by synchronizing two shafts, which can reduce synchronous error arising between the two shafts.

SUMMARY OF THE INVENTION

A servo controller according to one embodiment of the present invention is used in a machine tool for machining a workpiece by driving first and second shafts in synchronization with a predetermined synchronous ratio by means of electric motors, the servo controller includes: a first position feedback acquisition unit for acquiring the position feedback of the first shaft; a second position feedback acquisition unit for acquiring the position feedback of the second shaft; a converter for converting the acquired position feedback of the first shaft to a value corresponding to the position feedback of the second shaft by use of the synchronous ratio; a synchronous error calculator for calculating synchronous error which is difference between the converted position feedback of the first shaft and the position feedback of the second shaft; a positional deviation calculator for calculating a positional deviation of the second shaft which is difference between the position command for the second shaft and the position feedback of the second shaft; a filtering processor for extracting components in a predetermined frequency range from the difference between the synchronous error and the positional deviation of the second shaft; and, a positional deviation corrector for correcting the positional deviation of the second shaft by use of the output from the filtering processor.

A servo controller according to another embodiment of the present invention is used in a machine tool for machining a workpiece by driving first and second shafts in synchronization with a predetermined synchronous ratio by means of electric motors, the servo controller includes: a speed command acquisition unit for acquiring a speed command for the first shaft; a speed command converter for converting the acquired speed command for the first shaft to a value corresponding to the speed command for the second shaft by use of the synchronous ratio; a first speed feedback acquisition unit for acquiring the speed feedback of the first shaft; a first speed feedback converter for converting the acquired speed feedback of the first shaft to a value corresponding to the speed feedback of the second shaft by use of the synchronous ratio; a speed difference calculator for calculating a speed difference between the converted speed command for the first shaft and the converted speed feedback of the first shaft; a filtering processor for extracting speed difference components in a predetermined frequency range from the speed difference; and, a speed command corrector for correcting the speed command for the second shaft by use of the output from the filtering processor and the converted speed command for the first shaft.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
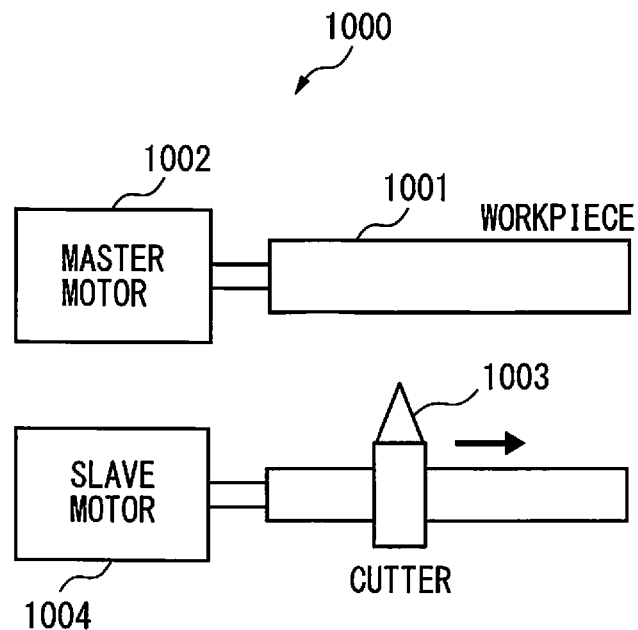
FIG. 1 is a schematic diagram of a machining system for performing a thread cutting process.
Figure 2:
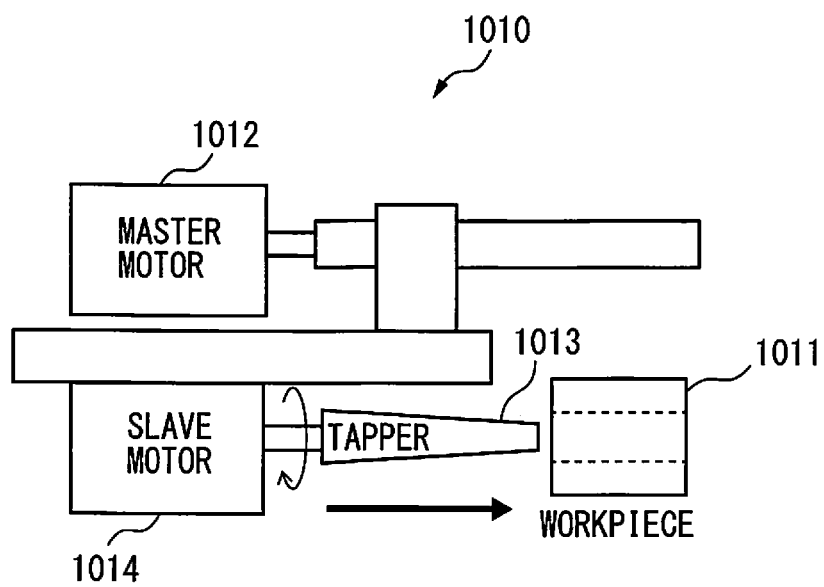
FIG. 2 is a schematic diagram of a tapping system.
Figure 3:
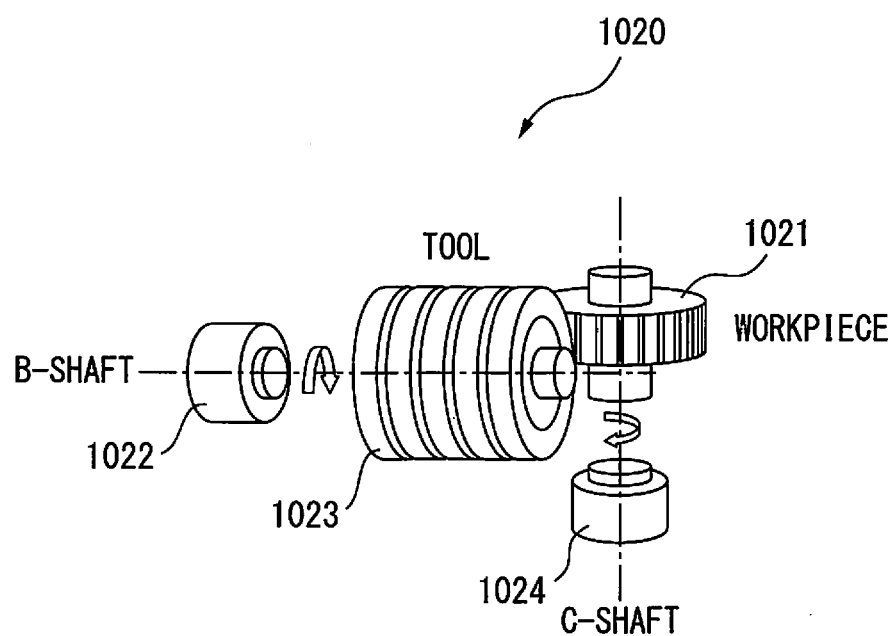
FIG. 3 is a schematic diagram of a gear generating system.
Figure 4:
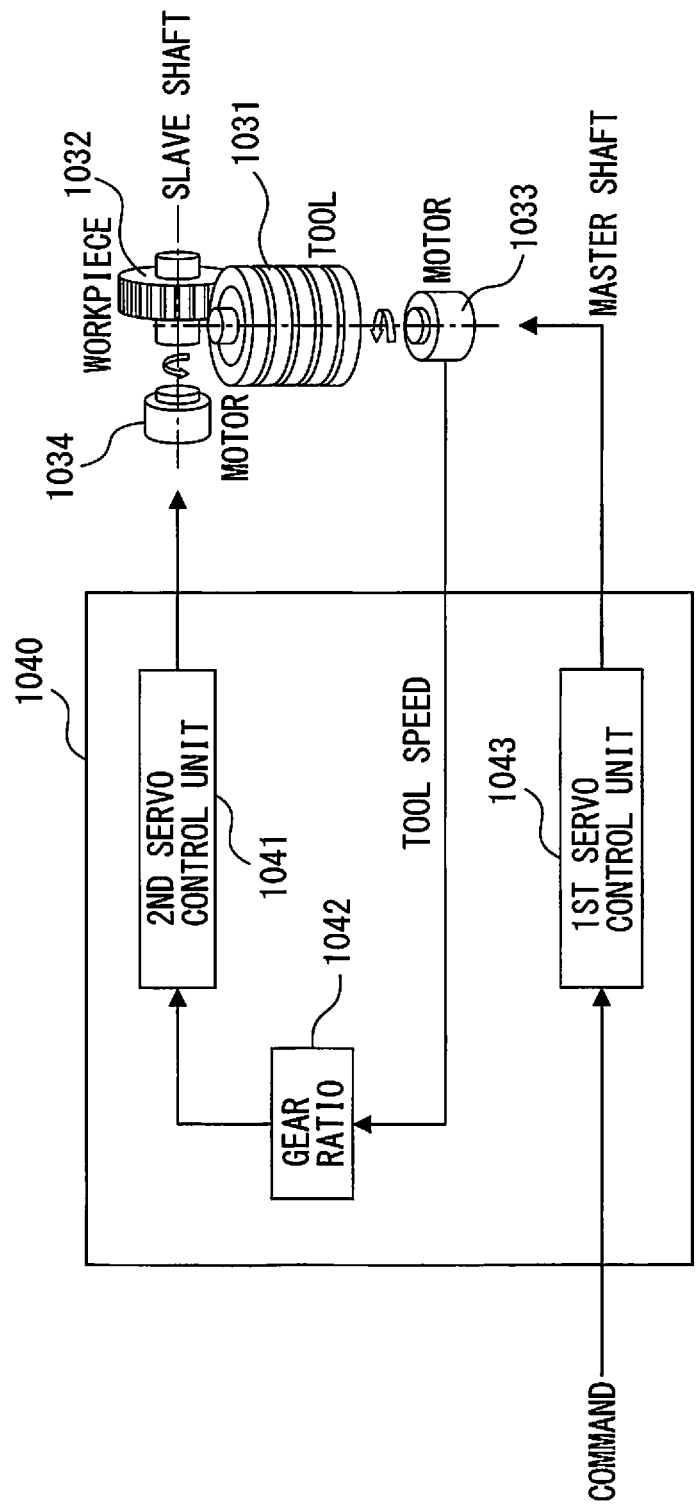
FIG. 4 is a schematic diagram of a machining system using a feedback tracking method.
Figure 5:
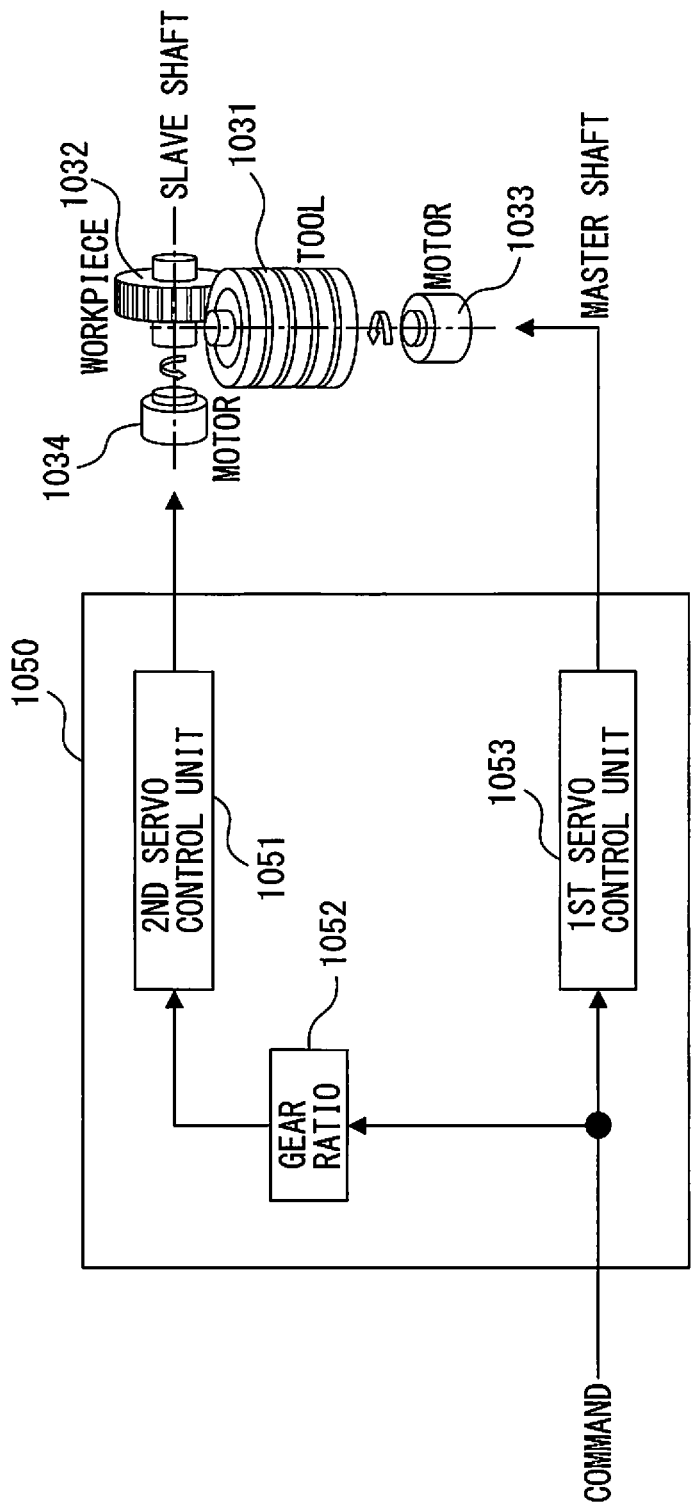
FIG. 5 is a schematic diagram of a machining system using a command distribution method.

Referring to the drawings, servo controllers according to the present invention will be described. However, it should be noted that the technical scope of the present invention is not limited by the embodied mode of these but embraces the inventions defined by the claims and equivalence.

First Embodiment

Figure 6:
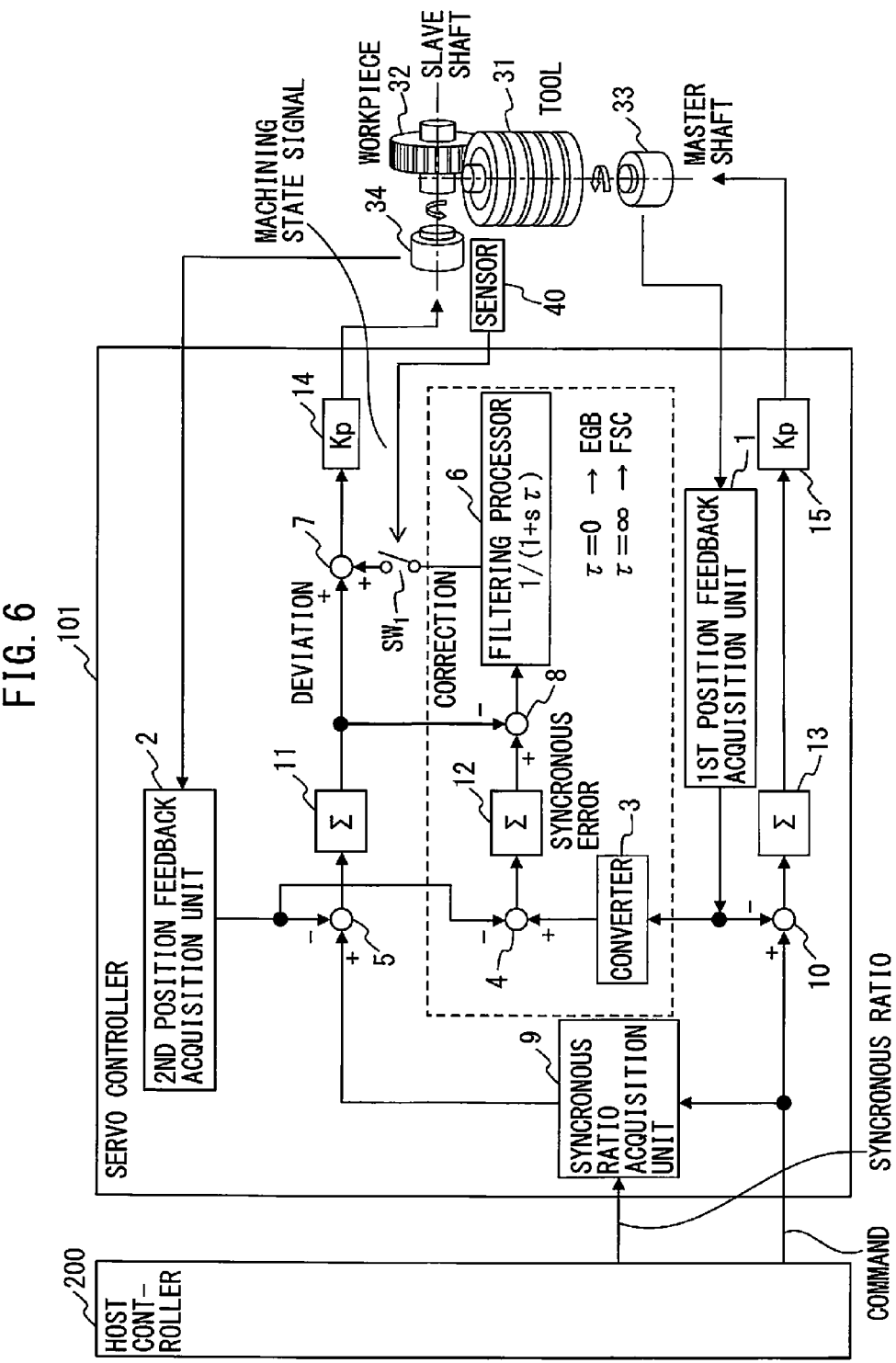
FIG. 6 is a block diagram of a system including a servo controller according to a first embodiment of the present invention.

A servo controller according to the first embodiment of the present invention will be described. FIG. 6 shows a block diagram of a system including a servo controller according to the first embodiment of the present invention. A servo controller 101 according to the first embodiment of the present invention is used for a machine tool in which a workpiece is machined by driving first and second shafts at a predetermined synchronous ratio by use of electric motors, the servo control controller 101 includes: a first position feedback acquisition unit 1 for acquiring the position feedback of the first shaft; a second position feedback acquisition unit 2 for acquiring the position feedback of the second shaft; a converter 3 that, based on the synchronous ratio, converts the acquired position feedback of the first shaft to a value corresponding to the position feedback of the second shaft; a synchronous error calculator 4 that calculates synchronous error which is difference between the converted position feedback of the first shaft and the position feedback of the second shaft; a positional deviation calculator 5 that calculates a positional deviation of the second shaft which is difference between the position command for the second shaft and the position feedback of the second shaft; a filtering processor 6 that receives the difference between the synchronous error and the positional deviation of the second shaft and extracts components in a predetermined frequency range; and, a positional deviation corrector 7 that corrects the positional deviation of the second shaft by use of the output from the filtering processor.

The servo controller 101 according to the first embodiment of the present invention is characterized by the steps of: in a gear generating process, calculating synchronous error by integrating differences of the position feedback of the second shaft which is the workpiece shaft, from the position command obtained as a product of the position feedback of the first shaft which is the tool shaft and synchronous ratio (gear ratio); passing the result obtained by subtracting the deviation of the workpiece shaft from the synchronous error through a low-pass filter to remove high-frequency components; and correcting the deviation of the workpiece shaft by use of the obtained result. Appropriate choice of the band of the low-pass filter makes it possible to suppress vibrations and improve stability and also expect the effect of lowering synchronous error due to speed variation of the tool shaft.

Next, a configuration of the servo controller according to the first embodiment of the present invention will be described. The servo controller 101 acquires a position command or speed command from a host controller 200, and based on the acquired position command or speed command, drives a master motor 33 for tuning a tool 31 about the master shaft and synchronously drives a slave motor 34 for tuning a workpiece 32 about the slave shaft at a fixed synchronous ratio with the master motor 33.

The position command obtained from the host controller 200 for driving the master motor 33 is input to a first subtractor 10, where the position feedback of the master shaft which is the first shaft is subtracted so as to calculate the positional deviation of the first shaft. The calculated positional deviation of the first shaft then passes through a first integration processor 13 and a first position gain regulator 15, and is input to the master motor 33 through a speed controller, a current controller and an amplifier (not shown).

A position sensor (not shown) is arranged near the master motor 33 so that the detected position data is fed back and input to the first position feedback acquisition unit 1. By differentiating the position data acquired by the first position feedback acquisition unit 1 by time, it is possible to determine the speed of the tool.

The servo controller 101 includes a synchronous ratio acquisition unit 9, which acquires a synchronous ratio from the host controller 200. Based on the acquired synchronous ratio, from the position command or the speed command (the command to the first shaft) for driving the master motor 33 for turning the tool 31, the position command or the speed command (the command to the second shaft) for driving the slave motor 34 for turning the workpiece 32 is calculated. However, the embodiment should not be limited to this configuration. The servo controller 101 may be provided with a synchronous ratio calculator that acquires a command to the first shaft and a command to the second shaft from the host controller 200 and calculates a synchronous ratio from the acquired commands to the first and second shafts.

The position command calculated by use of the synchronous ratio acquired by synchronous ratio acquisition unit 9 to drive the slave motor 34 is supplied to the positional deviation calculator 5, where the position feedback of the slave shaft which is the second shaft is subtracted so as to calculate the positional deviation of the second shaft. The calculated positional deviation of the second shaft is then processed through a second integration processor 11, a positional deviation corrector 7 and a second position gain regulator 14, and input to the slave motor 34 through a speed controller, current controller and amplifier (not shown).

A position sensor (not shown) is provided near the slave motor 34 so that the detected position data is input as the position feedback of the second shaft to the second position feedback acquisition unit 2.

The converter 3 converts the position feedback of the master shaft (first shaft) as the center shaft of the master motor 33, acquired by the first position feedback acquisition unit 1, to a value corresponding to the position feedback of the slave shaft (second shaft) as the center shaft of the slave motor 34, by use of the synchronous ratio acquired by the synchronous ratio acquisition unit 9.

The synchronous error calculator 4 calculates the difference between the converted result of the position feedback of the master shaft (first shaft) by the converter 3 and the position feedback of the slave shaft (second shaft) acquired by the second position feedback acquisition unit 2, and outputs this as synchronous error. The calculated synchronous error is integrated by a third integration processor 12.

The synchronous error integrated by the third integration processor 12 is input to a second subtractor 8 where difference of the synchronous error from the positional deviation of the second shaft integrated by a second integration processor 11 is calculated, and the calculated result is input to the filtering processor 6.

The filtering processor 6 receives the difference between the synchronous error and the positional deviation of the second shaft and extracts components in the predetermined frequency range and outputs the extracted components as correction data. The filtering processor 6 includes a low-pass filter whose transfer function is given by $1/(1+s\tau)$. Here, $s=j\omega$ is a variable in Laplace transformation, and $\tau$ is the time constant of the filter. When the time constant $\tau$ is set to zero, the system corresponds to the above control method 1). With the time constant $\tau$ set to infinity, the system coincides with the above control method 2).

The positional deviation corrector 7 corrects the positional deviation of the second shaft by use of the correction data output from the filtering processor 6.

Herein, instead of regular input, the correction data output from the filtering processor 6 may be input to the positional deviation corrector 7 only when the tool 31 and the workpiece 32 to be processed operate in synchronization. Specifically, it is possible to provide a configuration in which a machining state sensor 40 that outputs a machining state signal indicating whether the tool 31 and workpiece 32 are operating in synchronization is arranged near them while a switch $SW_1$ is provided so that the positional deviation corrector 7 can correct the positional deviation of the second shaft in accordance with the machining state signal. For example, an AE (acoustic emission) sensor may be used to detect contact between the tool 31 and workpiece 32, determine from this that the machining state has started and turn on the machining state signal. Alternatively, instead of using a machining state sensor 40, it is possible to determine a transition into a machining state and thereby turn on the machining state signal based on change of the torque command (or current feedback) to the tool shaft drive motor 33 or to the workpiece shaft drive motor 34, since load increases when the tool contacts the workpiece and the torque command or current feedback increases.

Figure 7:
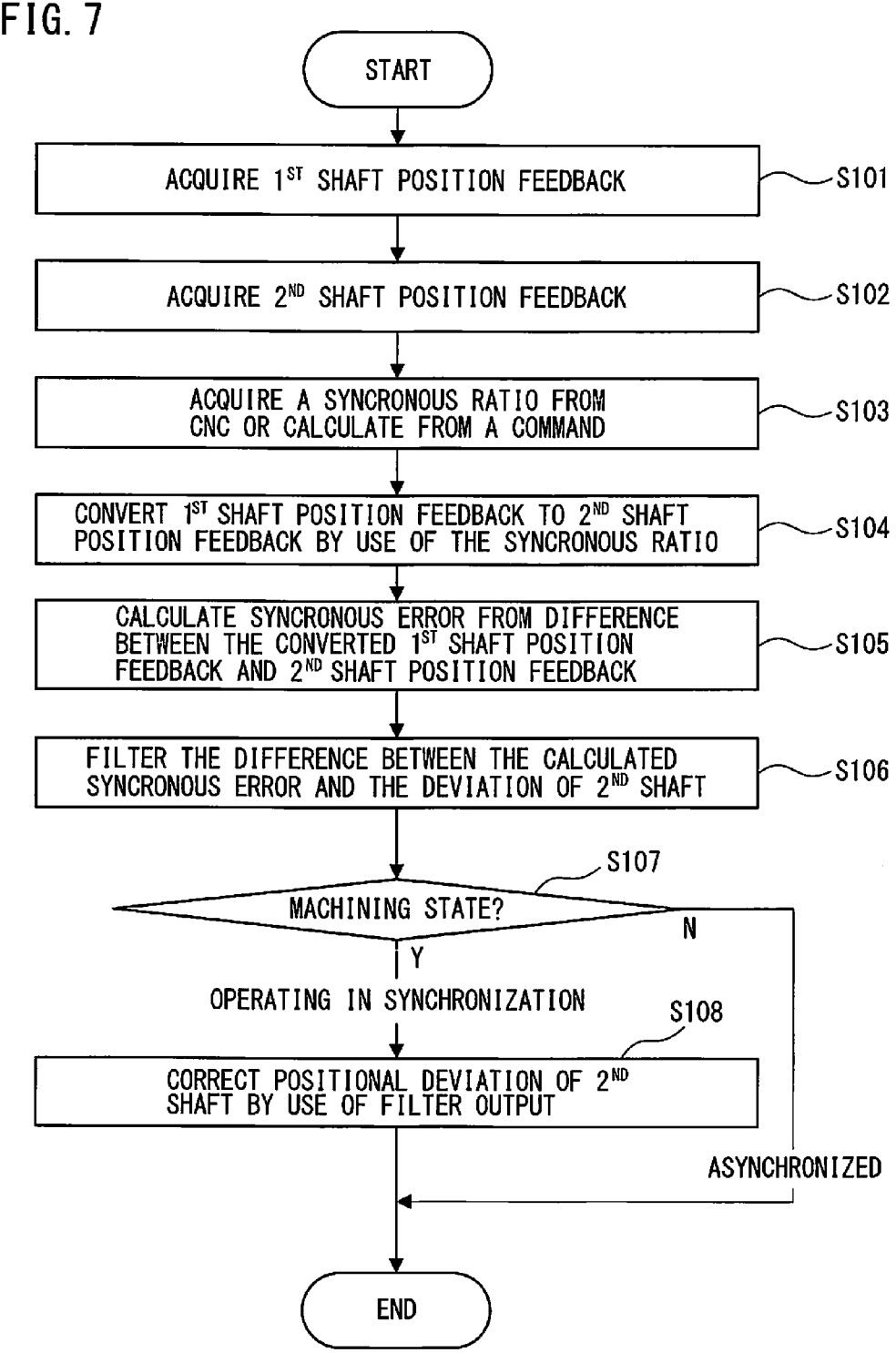
FIG. 7 is a flow chart for illustrating operational steps of a servo controller according to the first embodiment of the present invention.

Next, the operational steps of the servo controller according to the first embodiment of the present invention will be described using a flow chart in FIG. 7. First, at Step S101 the first position feedback acquisition unit 1 acquires the position feedback of the first shaft. Next, at Step S102 the second position feedback acquisition unit 2 acquires the position feedback of the second shaft.

Next, at Step S103 the synchronous ratio acquisition unit 9 acquires a synchronous ratio from the host controller 200 which is a CNC (Computer Numerical Controller), or the synchronous ratio calculator calculates a synchronous ratio from a command.

Next, at Step S104 the converter 3 converts the position feedback of the first shaft to a value corresponding to the position feedback of the second shaft by use of the synchronous ratio. Next, at Step S105 the synchronous error calculator 4 calculates synchronous error from the difference between the converted position feedback of the first shaft and the position feedback of the second shaft.

Next, at Step S106 the filtering processor 6 performs a filtering process on the difference between the calculated synchronous error and the deviation of the second shaft. Next, at Step S107 the positional deviation corrector 7 determines whether the tool 31 and the workpiece 32 are in a machining state based on a machining state signal that indicates whether the tool 31 and the workpiece 32 to be processed are synchronized.

When the tool 31 and the workpiece 32 workpiece to be processed are in a machining state, the positional deviation corrector 7 determines that the master motor 33 for turning the tool 31 and the slave motor 34 for turning the workpiece 32 are operating in synchronization. In Step S108, the positional deviation corrector 7 corrects the positional deviation of the second shaft by use of the filter output.

On the other hand, when the tool 31 and the workpiece 32 to be processed are not in a machining state, it is determined that the master motor 33 and the slave motor 34 are not operating in synchronization (asynchronous), so that a series of operation is ended.

Figure 8A:
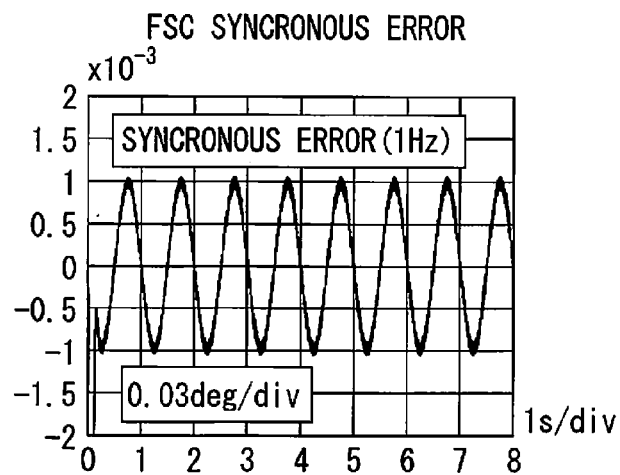
FIG. 8A is a diagram showing synchronous error when a command distribution method (FSC) is used.
Figure 8B:
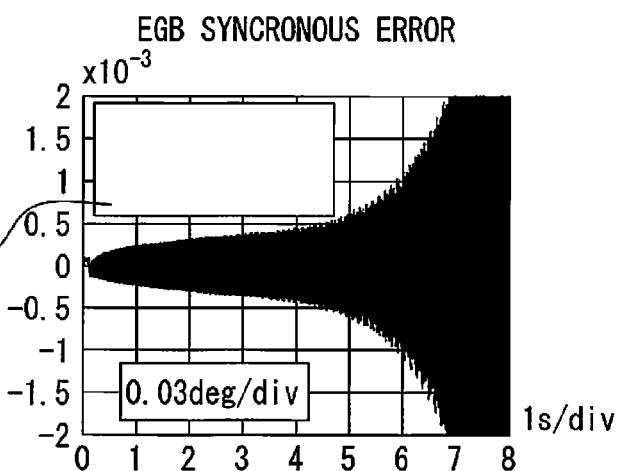
FIG. 8B is a diagram showing synchronous error when a feedback tracking method (EGB) is used.
Figure 8C:
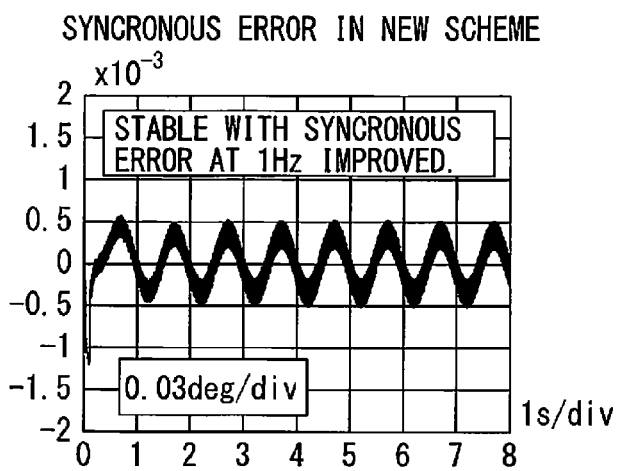
FIG. 8C is a diagram showing synchronous error when a servo controller of the present invention is used.

Next, the effect obtained by the servo controller according to the first embodiment of the present invention will be described. FIGS. 8A to 8C represent results of numerical simulation for a model where, in gear generating process, when the tool shaft and the workpiece shaft are driven in synchronization at a predetermined gear ratio, a speed variation of the tool shaft occurs due to a 1 Hz machining disturbance while the workpiece shaft has natural vibration of 300 Hz. In each of the graphs in FIGS. 8A to 8C, the vertical axis denotes the magnitude of synchronous error and the horizontal axis represents time.

FIG. 8A represents synchronous error in the case of the command distribution method (Flexible Synchronous Control: FSC) described in the above 2). In the command distribution method (FSC), it is understood that the speed variation of the tool shaft of 1 Hz arises as synchronous error.

FIG. 8B represents synchronous error in the case of the feedback tracking method (Electric Gear Box: EGB) described in the above 1). In the feedback tracking method (EGB), it is understood that vibration of 300 Hz arises, making the operation unstable.

FIG. 8C represents synchronous error in the case where the servo controller according to the first embodiment of the present invention is used. It is understood that use of the servo controller according to the first embodiment of the present invention can suppress both the vibration of 300 Hz and the synchronous error of 1 Hz.

As described heretofore, according to the servo controller of the first embodiment of the present invention, synchronous error between two electric motors is used to determine correction, and this is added to the positional deviation of one of the shafts, thereby it is possible to suppress synchronous error.

Second Embodiment

Figure 9:
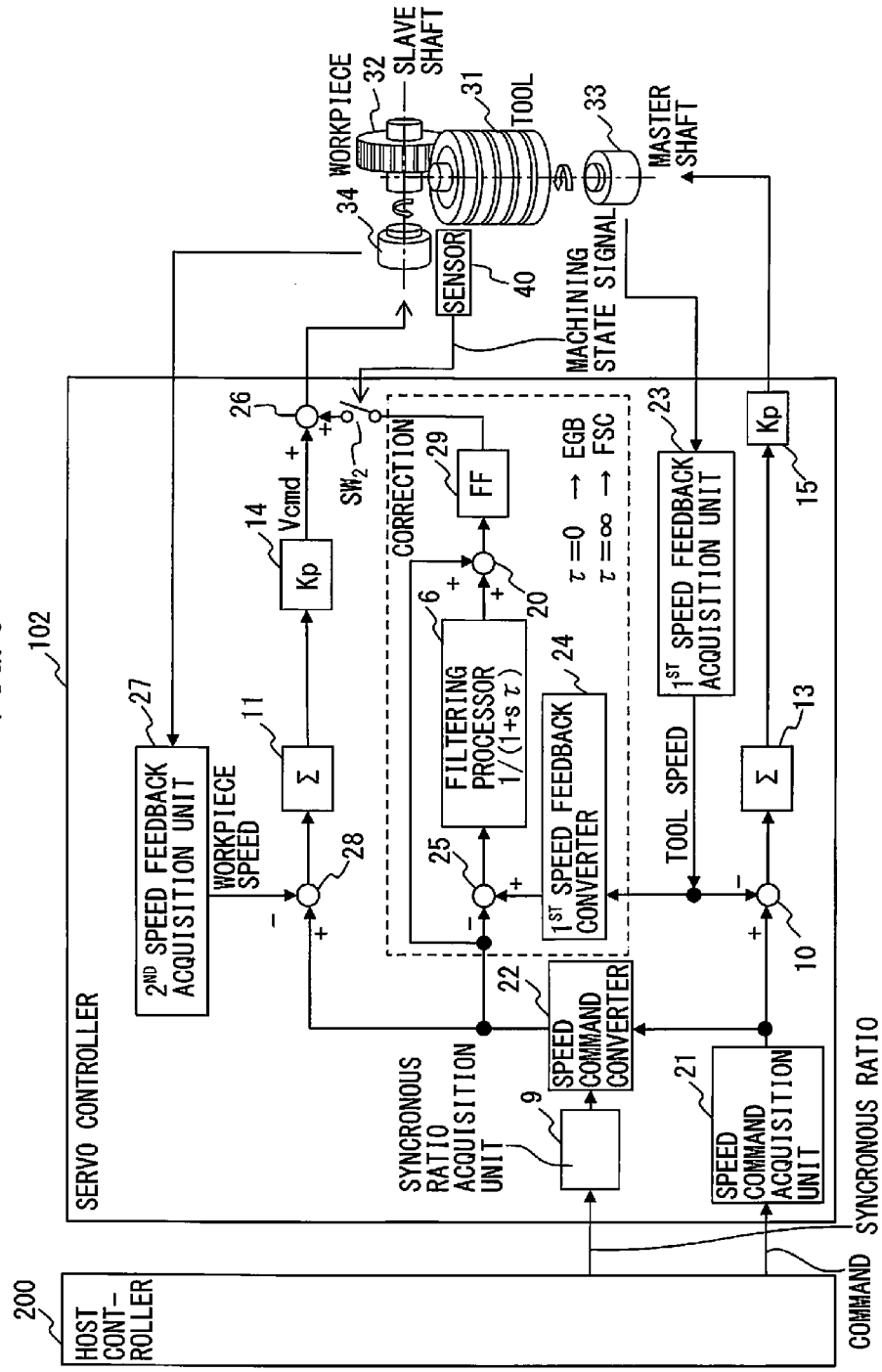
FIG. 9 is a block diagram of a system including a servo controller according to a second embodiment of the present invention; and, FIG. 10 is a flow chart for illustrating operational steps of a servo controller according to the second embodiment of the present invention.

Next, a servo controller according to Embodiment 2 of the present invention will be described. FIG. 9 shows a block diagram of a system including a servo controller according to the second embodiment of the present invention. A servo controller 102 according to the second embodiment of the present invention is used for a machine tool in which a workpiece is machined by driving first and second shafts at a predetermined synchronous ratio by use of electric motors, the servo controller 102 includes: a speed command acquisition unit 21 for acquiring a speed command for the first shaft; a speed command converter 22 that, based on the synchronous ratio, converts the acquired speed command for the first shaft to a value corresponding to the speed command for the second shaft; a first speed feedback acquisition unit 23 for acquiring the speed feedback of the first shaft; and a first speed feedback converter 24 that converts the acquired speed feedback of the first shaft to a value corresponding to the speed feedback of the second shaft by use of the synchronous ratio; a speed difference calculator 25 that calculates the speed difference between the converted speed command for the first shaft and the converted speed feedback of the first shaft; a filtering processor 6 that extracts speed difference components in a predetermined frequency range from the speed difference; and a speed command corrector 26 that corrects the speed command for the second shaft, based on the output from the filtering processor and the converted speed command for the first shaft.

Since the servo controller according to the second embodiment performs the following feed-forward control in addition to the servo controller according to the first embodiment, it is possible to further improve the effect of suppressing synchronous error.

The difference between the speed command obtained as a product of the speed command for the tool shaft and the gear ratio and the speed obtained as a product of the speed feedback of the tool shaft and the gear ratio is calculated. The difference is subjected to the low-pass filtering process, and the result and the aforementioned speed command are added by an adder 20. The obtained result is multiplied by a feed-forward coefficient to correct the speed command for the workpiece shaft. Appropriate choice of the band of the low-pass filter makes it possible to reduce the number of synchronous errors due to speed variation of the tool shaft.

In FIG. 9, a second speed feedback acquisition unit 27 acquires the speed (workpiece speed) feedback of the second shaft. A subtractor 28 calculates the difference between the value corresponding to the speed command for the second shaft, converted by the speed command converter 22 and the speed feedback of the second shaft, namely, the speed deviation of the second shaft. An FF (29) represents a feed-forward coefficient. When the time constant of the low-pass filter is zero, the feed-forward control uses the speed command for the tool shaft, whereas when the time constant is infinite, the feed-forward control uses the speed feedback of the tool shaft.

Herein, instead of regular input, the correction data output from the filtering processor 6 may be input to the speed command corrector 26 only when the tool 31 and the workpiece 32 to be processed operate in synchronization. Specifically, a machining state sensor 40 that outputs a machining state signal indicating whether the tool 31 and workpiece 32 are operating in synchronization may be arranged near the tool 31 and workpiece 32 while the speed command corrector 26 may be provided with a switch SW$_2$ so as to correct the speed command for the second shaft in accordance with the machining state signal.

Figure 10:
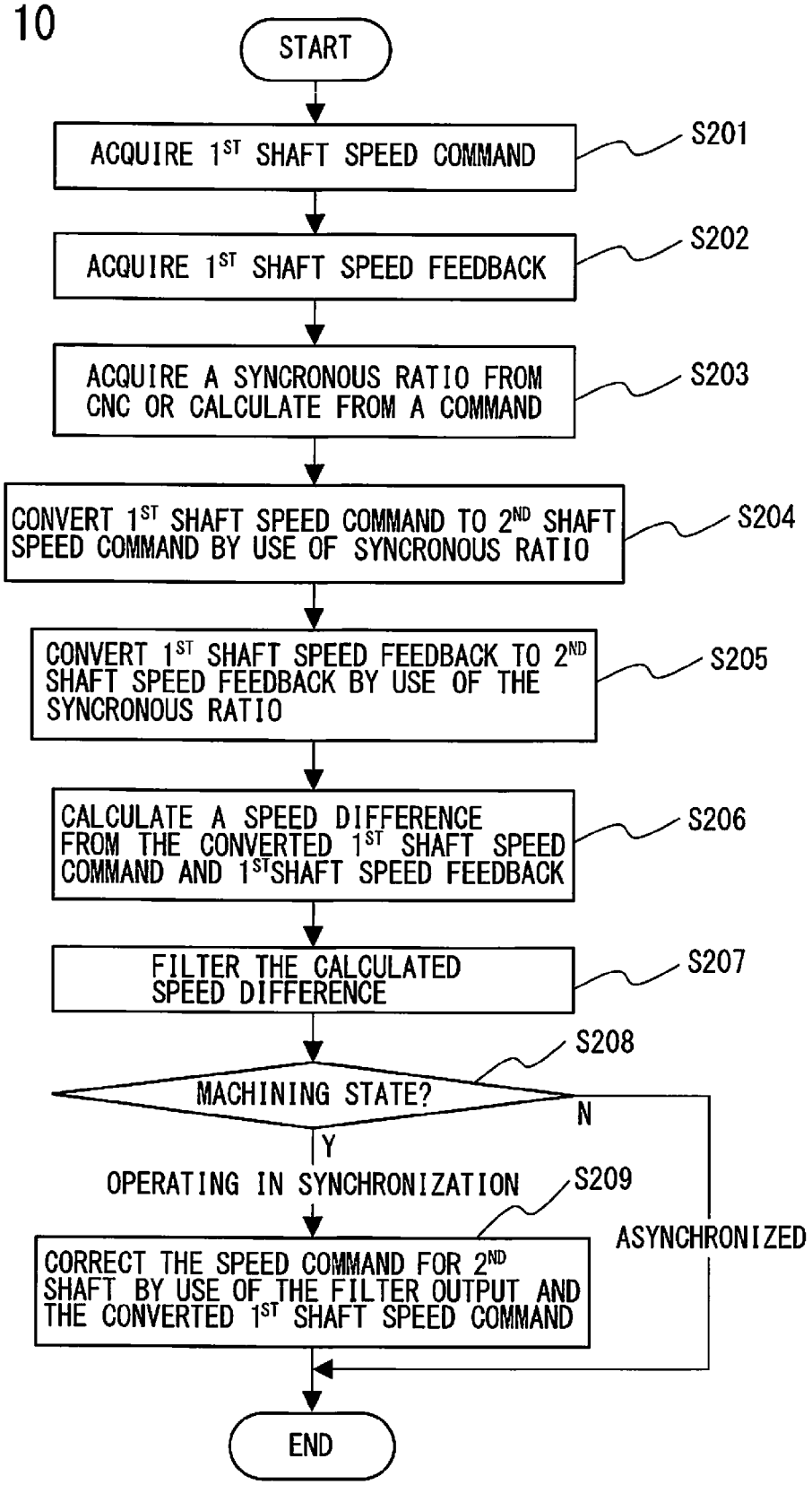

Next, the operational steps of the servo controller according to the second embodiment of the present invention will be described using a flow chart in FIG. 10. First, at Step S201 the speed command acquisition unit 21 acquires a speed command for the first shaft. Then, at Step S202 first speed feedback acquisition unit 23 acquires the speed feedback of the first shaft.

Next, at Step S203 the synchronous ratio acquisition unit 9 acquires a synchronous ratio from the host controller 200 which is a CNC, or the synchronous ratio calculator calculates a synchronous ratio from a command.

Next, at Step S204 the speed command converter 22 converts the speed command for the first shaft to the speed command for the second shaft by use of the synchronous ratio. Next, at Step S205 the first speed feedback converter 24 converts the speed feedback of the first shaft to the speed feedback of the second shaft by use of the synchronous ratio. Then, at Step S206 the speed difference calculator 25 calculates the speed difference from the converted values of the speed command for the first shaft and the speed feedback of the first shaft.

Next, at Step S207 the filtering processor 6 performs a filtering process on the calculated speed difference. Next, at Step S208 the speed command corrector 26 determines whether the tool 31 and the workpiece 32 are in a machining state based on a machining state signal that indicates whether the tool 31 and the workpiece 32 to be processed are operating in synchronization.

When the tool 31 and the workpiece 32 to be processed are in a machining state, the speed command corrector 26 determines that the master motor 33 for turning the tool 31 and the slave motor 34 for turning the workpiece 32 are operating in synchronization, and the speed command corrector 26 corrects the speed command for the second shaft by use of the filter output and the converted speed command for the first shaft, at Step S209.

On the other hand, when the tool 31 and the workpiece 32 to be processed are not in a machining state, it is determined that the master motor 33 and the slave motor 34 are not synchronized (asynchronous), so that a series of operation is ended.

According to the servo controller of the second embodiment of the present invention, use of the above-described feed-forward control in addition to the servo controller according to the first embodiment, makes it possible to further improve the effect of suppressing synchronous error.

According to the present invention, performing a low-pass filtering process on synchronous error shuts off synchronous error of high frequencies and extracts synchronous error of low frequencies alone. Use of this enables correction of the positional deviation of one of the shafts. Shutting off high frequencies makes it possible to suppress amplification of high-frequency vibrations and reduces synchronous error due to low-frequency speed variation of the master shaft.

What is claimed:

1. A servo controller for use in a machine tool, the machine tool configured for machining a workpiece by driving first and second shafts in synchronization with a synchronous ratio by means of electric motors, the servo controller comprising:
   a first position feedback acquisition unit for acquiring a position feedback of the first shaft;
   a second position feedback acquisition unit for acquiring a position feedback of the second shaft;
   a converter for converting the acquired position feedback of the first shaft to a converted position feedback corresponding to the position feedback of the second shaft by use of the synchronous ratio;
   a synchronous error calculator for calculating a synchronous error which is a difference between the converted position feedback of the first shaft and the position feedback of the second shaft;
   a positional deviation calculator for calculating a positional deviation of the second shaft which is a difference between a position command for the second shaft and the position feedback of the second shaft;
   a filtering processor for extracting components in a predetermined frequency range from a difference between the synchronous error and the positional deviation of the second shaft; and
   a positional deviation corrector for correcting the positional deviation of the second shaft by use of the components extracted and output from the filtering processor.

2. A servo controller for use in a machine tool, the machine tool configured for machining a workpiece by driving first and second shafts in synchronization with a synchronous ratio by means of electric motors, the servo controller comprising:
   a speed command acquisition unit for acquiring a speed command for the first shaft;
   a speed command converter for converting the acquired speed command for the first shaft to a converted speed command corresponding to the speed command for the second shaft by use of the synchronous ratio;
   a first speed feedback acquisition unit for acquiring a speed feedback of the first shaft;
   a first speed feedback converter for converting the acquired speed feedback of the first shaft to a converted speed feedback corresponding to the speed feedback of the second shaft by use of the synchronous ratio;
   a speed difference calculator for calculating a speed difference between the converted speed command for the first shaft and the converted speed feedback of the first shaft;

a filtering processor for extracting speed difference components in a predetermined frequency range from the speed difference; and a speed command corrector for correcting a speed command for the second shaft by use of
- the speed difference components extracted and output from the filtering processor, and
- the converted speed command for the first shaft.

3. The servo controller according to claim 1, further comprising a synchronous ratio acquisition unit for acquiring the synchronous ratio from a host controller.

4. The servo controller according to claim 1, further comprising a synchronous ratio calculator for calculating the synchronous ratio from a command for the first shaft and a command for the second shaft.

5. The servo controller according to claim 1, wherein the positional deviation corrector is configured to correct the positional deviation of the second shaft in accordance with a machining state signal that indicates whether a tool driven by the first shaft and the workpiece driven by the second shaft are operating in synchronization.

6. The servo controller according to claim 2, wherein the speed command corrector is configured to correct the speed command for the second shaft in accordance with a machining state signal that indicates whether a tool driven by the first shaft and the workpiece driven by the second shaft are operating in synchronization.

* * * * *